United States Patent [19]

Kumasaka et al.

[11] Patent Number: 4,851,942
[45] Date of Patent: Jul. 25, 1989

[54] FLOATING MAGNETIC HEAD HAVING A MAGNETIC CORE BURIED IN A CHANNEL ON AN AIR BEARING RAIL

[75] Inventors: Niroyuki Kumasaka, Oume; Shigekazu Otomo, Sayama; Takeo Yamashita, Tachikawa; Noritoshi Saito, Tokyo; Yokuo Saitoh, Kanagawa; Hiroshi Sakurai, Odawara, all of Japan

[73] Assignee: Hitachi, Ltd., Tokyo, Japan

[21] Appl. No.: 95,751

[22] Filed: Sep. 14, 1987

[30] Foreign Application Priority Data

Sep. 17, 1986 [JP] Japan ................. 61-217123

[51] Int. Cl.⁴ .......................... G11B 5/60; G11B 21/21
[52] U.S. Cl. ..................................................... 360/103
[58] Field of Search ........................................ 360/103

[56] References Cited

FOREIGN PATENT DOCUMENTS 61-42720  3/1986  Japan ................................. 360/103
62-75927  4/1987  Japan ................................. 360/103

Primary Examiner—Robert S. Tupper
Attorney, Agent, or Firm—Antonelli, Terry & Wands

[57] ABSTRACT

A core burying channel is formed on the outer side surface of an air bearing rail of a floating magnetic head floating on a magnetic disk by an air-flow in a direction perpendicular to a magnetic recording medium travelling direction, and a magnetic core is buried in this core burying channel. This magnetic head can be produced easily by a production method which forms a core burying channel in a non-magnetic block, then deposits a magnetic material to the core burying channel and removes unnecessary portions of the magnetic material.

6 Claims, 7 Drawing Sheets

FLOATING MAGNETIC HEAD HAVING A MAGNETIC CORE BURIED IN A CHANNEL ON AN AIR BEARING RAIL

BACKGROUND OF THE INVENTION

This invention relates generally to a floating magnetic head used in an external memory apparatus and more particularly to a floating magnetic head suitable for high density recording and reproduction.

Examples of the conventional floating magnetic heads used in a magnetic disk device are shown in FIGS. 13a, 13b, 14a and 14b. FIGS. 13a and 14a are perspective views of the floating magnetic heads and FIGS. 13b and 14b are enlarged view of the principal portion of the cores of the magnetic heads, respectively.

FIG. 13a shows the floating magnetic head which has been put into practical application (and is referred to as a "composite head") 10. This floating magnetic head 10 consists of a floating member 11 made of a non-magnetic material and a magnetic head core 12 made of a high permeability ferrite. In the magnetic head core 12, reference numeral 14 represents a coil and 15 does a transducing gap.

In this floating magnetic head, the floating member 11 and the magnetic head core 12 are fabricated separately, a channel 23 is formed at the end portion of an air bearing rail 13 of the floating member 11 and the magnetic head core 12 is fitted into this channel and secured thereto by a resin or glass.

Next, FIG. 14a is a perspective view of another conventional floating megnetic head 25 which is described in Japanese Patent Laid-Open No. 80519/1986.

This floating magnetic head 25 consists of a pair of magnetic core halves 16, 17, a transducing gap 18, a coil 19, and the like. The floating magnetic head 25 is fabricated by butting and joining one of the magnetic core halves 16 to the other 17 through a non-magnetic member that forms the transducing gap 18. Incidentally, the magnetic core half 17 has a structure wherein it is used also as the floating member. In the magnetic core half 16, a magnetic member 20 is interposed by a pair of narrow supporting plates 21a, 21b made of a non-magnetic member. The magnetic member 20 is made of a soft magnetic material such as an Fe-Al-Si alloy, permalloy or an amorphous alloy, and is formed on at least one of the supporting plates 21a, 21b by thin film formation technique. In the magnetic core half 16, the supporting plate 21a on which the magnetic film is formed is bonded to the other 21b by use of low melting glass.

The other magnetic core half 17 has a soft magnetic member 20' which is the same material as that of the magnetic member 20, interposed by floating members 22a and 22b and bonded by low melting glass.

In the manner described above, the magnetic core halves 16 and 17 are bonded and integrated with each other through the non-magnetic gap material and constitute the floating magnetic head 25.

In this floating magnetic head, the magnetic material that forms the magnetic circuit is the Fe-Al-Si alloy, permalloy or amorphous magnetic material and is therefore suitable as the head for high density recording.

The problems of the conventional floating magnetic heads described above will now be explained with reference to FIGS. 13b and 14b.

First of all, in the prior art example shown in FIG. 13b, the magnetic head core 12 is fitted into the channel 23 that is formed on the air bearing rail 13 of the floating member 11, and is then secured thereto by glass or the like. Accordingly, this head involves the following problems:

(1) In the steps of forming separately the magnetic core 12 and fitting and securing it into the channel 23 of the floating member 11, a position error of the magnetic head core occurs and results in the drop of production yield.

(2) Since the gap depth of the magnetic head core 12 is positioned inside the floating member 11, a reference level must be disposed separately at the time of working the gap depth and satisfactory machining accuracy cannot be obtained.

(3) Two bonding positions, at which bonding must be made by use of glass or the like, exist during the production process of the floating magnetic head. For example, the magnetic head core 12 which is bonded by use of glass when forming the transducing gap 15 is fixed by glass when it is fitted and secured to the floating member 11. When such two glass bonding portions exist, the glass used for fitting the magnetic head core to the floating member must have a lower softening point than that of the glass which is used for bonding the transducing gap of the magnetic head core, unless otherwise the glass for bonding the magnetic head core gets softened when the magnetic head core 12 is fitted to the floating member 11, and results in peel. Therefore, the glass used for bonding the magnetic head core must be the one that has a high melting point and is not softened at least the heating temperature of fitting the floating member.

For these reasons, the range of selection of glass is limited and production must be carried out within limited temperature allowance. As a result, the problems of inferior packing of glass and remaining bubbles in the glass occur.

Next, in the other floating magnetic head 25 shown in FIG. 14a, a pair of magnetic core halves 16 and 17 are coupled integrally with each other by the transducing gap 18 as shown in FIG. 14b which is an enlarged perspective view of the principal portion. In the magnetic core half 17, the magnetic member 20' constituting the magnetic circuit is interposed by the floating members 22a and 22b and is bonded to either one of the surfaces through the glass film. In FIG. 14b, for example, the magnetic member 20' is formed on the floating member 22a and the other floating member 22b is bonded onto the joint surface 24 through the glass film, thereby forming the core half 17.

In the other magnetic core half 16, the magnetic member 20 is formed on the supporting plate 21a and the other supporting plate 21b is bonded thereto through the glass film. Thereafter, the magnetic core halves 16 and 17 are coupled to each other through the transducing gap 18 to form the floating magnetic head.

The floating magnetic head having such a structure is not free from the following problems.

(1) In the floating magnetic head of this kind, a plurality of positions, where bonding must be made by glass or the like, exist in the same way as in the prior art example shown in FIGS. 13a and 13b. In other words, the floating member 22b is bonded to one (17) of the magnetic core halves after the magnetic film 20 is formed on the floating member 22a. The other magnetic core half 16 is bonded to the other supporting plate 21b after the magnetic film 20 is formed on the supporting plate 21a. Furthermore, the magnetic core halves 17 and 16 are coupled together through the transducing gap 18 to form the floating magnetic head.

If a large number of bonding positions exist, a positioning error at the time of bonding and breakage during machining will occur and reduce the production yield.

(2) If a metallic magnetic material having a high saturation flux density is used as the magnetic material, peel will occur during machining because bonding power is low between the metal and glass.

The following references are cited to show the state of the art:

(1) U.S. Patent Specification No. 3,823,416 to Warner
(2) Japanese Patent Laid-Open No. 139118/1984

SUMMARY OF THE INVENTION

It is therefore the main object of the present invention to provide a floating magnetic head and its production method which head eliminates the problems of the prior art technique described above, can be produced easily but has high reliability.

In a floating magnetic head of the type wherein a magnetic head core is disposed on at least one air bearing rail of a floating member that floats on a magnetic disk by an air-flow, the object of the invention described above can be accomplished by the construction wherein the magnetic head core is buried in a core burying channel (or a channel for burying the magnetic head core) that is formed on the outer side surface of at least one air bearing rail substantially at right angles to surface facing a magnetic recording medium. To obtain a high density recording magnetic head, it is more desirable to use a soft magnetic material having a high saturation flux density than a high permeability ferrite. A transducing gap is formed on a split surface which is in parallel with the core burying channel (that is, perpendicular to the upper surface of the air bearing rail or the surface of the air bearing rail facing the magnetic recording medium) and substantially perpendicular to the magnetic recording medium travelling direction. The edge portion of the magnetic head core in the magnetic recording medium travelling direction, when viewed from the side of the surface facing the magnetic recording medium, is preferably arranged in non-parallel with the transducing gap.

Generally, the core is from 10 to 50 $\mu$m thick (e.g. c in FIG. 1), the core burying channel is from 30 to 100 $\mu$m deep (e.g. d in FIG. 5a) and the air bearing rail is from 0.4 to 0.8 mm wide (e.g. T in FIGS. 1 and 3), but these values are not particularly limitative. The bottom of the core burying channel is arranged to be more outward than the center of the air bearing rail in the transverse direction. If the core burying channel is made deep and its bottom is positioned more inward than the center of the air bearing rail, the channel is formed deeply on the air bearing rail and floating height gets unstable.

Generally, the distance between the magnetic head core and the trailing face of the air bearing rail (e.g. l' in FIG. 5a) is from 0.05 to 0.2 mm. If the distance is too small, strength will drop at the trailing edge portion of the air bearing rail and if it is too great, a sufficient core width cannot be secured.

The transducing gap is mostly positioned near the center of the magnetic head core in the magnetic recording medium travelling direction and the width of the magnetic core in the magnetic recording medium travelling direction (e.g. b in FIG. 1) is mostly from 1.5 to 3 mm. However, these values are not particularly limitative.

A 0.3 mm-deep bleed slot, which is known in the art, is formed on the floating member. In order to expose a winding window disposed on the air bearing rail to penetrate through the magnetic head core, a channel is formed on the trailing face of the floating member in such a manner as to leave the air bearing rail. Needless to say, a coil winding is disposed.

The magnetic head core materials to be used in the present invention are crystalline alloys represented by Fe-Al-Si alloys (called "sendust") and Ni-Fe alloy (called "permalloy") and amorphous alloys represented by Co-Nb-Zr, Co-Ta-Zr, and the like. The magnetic head core is formed by known thin film formation technique such as sputtering, vacuum deposition, and the like. Ceramic materials such as aluminous titanium carbide, calcium titanate, zirconia, barium titanate etc. or crystallized glass, that have excellent abrasion resistance proporty to the recording medium, are used as the material of the floating member.

The floating magnetic head of the present invention is produced in accordance with the following production method.

step (a):
A step where a rectangular non-magnetic block as floating member is prepared and the core burying channel for burying the magnetic core is formed on the side surface of the floating magnetic head.

step (b):
A step where the magnetic material which is to serve as the magnetic core head is deposited to the core burying channel formed at the step (a) by known thin film formation technique such as sputtering or vacuum deposition.

step (c):
A step where unnecessary portions of the magnetic film formed at the step (b) are removed.

step (d):
A step where the block obtained at the step (c) is split in the direction of film thickness at the portion, which will become substantially the center of the magnetic film, to form two core half blocks. Since the cut and split face is a transducing gap formation face, lapping is effected on this face.

step (e):
A step where a channel for a coil winding is formed on at least one of the transducing gap formation faces of the pair of magnetic core halves obtained at the step (d), and then a non-magnetic film necessary for forming the transducing gap is formed.

step (f):
· A step where the gap forming faces of the pair of magnetic core halves are butted to each other in such a manner as to bring their magnetic films, which are to serve as the magnetic cores, into mutual contact and bonded together integrally by pressing and heating.

step (g):
A step where the magnetic core block obtained at the step (f), which provides a plurality of magnetic cores, is cut and split into a plurality of individual magnetic core blocks.

step (h):
A step where an air bleed slot is formed on the surface of said magnetic core block, facing the recording medium, in such a manner as to leave a predetermined air bearing rail.

step (i):

A step where a channel is formed on the other magnetic core half facing one of the magnetic core halfs, which is to serve as the floating member, through the transducing gap so as to expose a winding window together with the step (h).

Furthermore, other works such as formation of a slope at a predetermined portion of the air bearing rail are conducted, a coil is wound on the coil winding window and the floating magnetic head can be obtained.

The floating magnetic head of the present invention has the following advantages.

Since the magnetic head core portion is disposed on the side surface of the floating member and is buried in the core burying channel, the bonding position is only at the transducing gap forming portion and selection of bonding glass becomes easy. This is particularly advantageous for the case where the magnetic head must be produced at a temperature below the crystallizing temperature such as when the magnetic head core member is made of an amorphous magnetic material. Since the magnetic head core portion is buried in the core burying channel of the floating member, the structure is free from the problem of peel and provides a high production yield.

Since the magnetic core is disposed on the side surface of the floating member, the depth of the transducing gap can be observed and measured directly and machining can be made at a high level of dimensional accuracy.

Since the trailing edge of the magnetic core is inclined in such a manner as to be out of parallelism with the transducing gap, any adverse influences of the contour effect (the reproducing action at the edge of the magnetic core) are not exerted.

The floating magnetic head of the invention is suitable for high density recording because the magnetic core portion is made of a soft magnetic material having a high saturation flux density. Since the magnetic head core portion can be formed compactly, there can be obtained a magnetic head having small inductance but providing a great effect.

DESCRIPTION OF THE PREFERRED EMBODIMENTS

Embodiment 1

Figure 1:
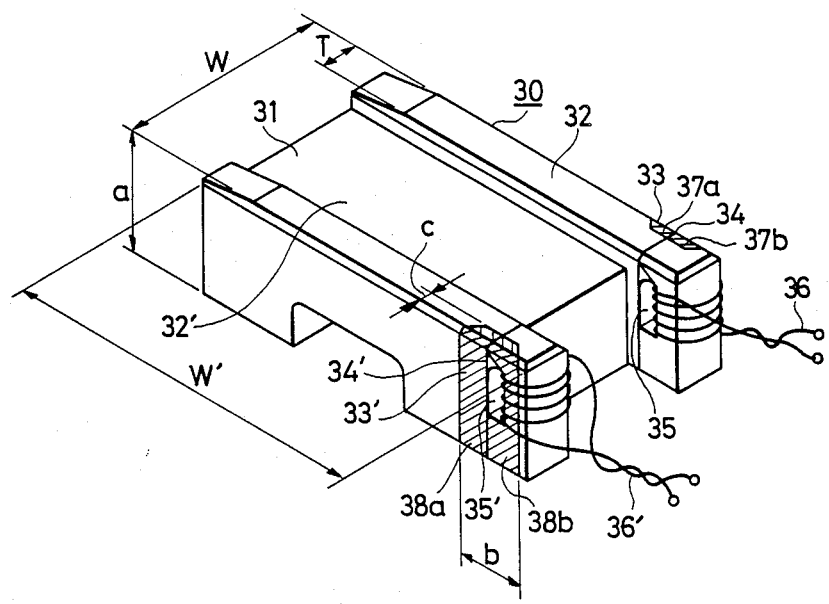
FIG. 1 is a perspective view of a floating magnetic head in accordance with one embodiment of the present invention.

FIG. 1 is a perspective view showing a floating magnetic head in accordance with a first embodiment of the present invention. In the drawing, reference numeral 30 represents a floating magnetic head and 31 is a floating member for floating on the magnetic disk. Reference numeral 32 represents an air bearing rail, whose shape acts on the floating height. Reference numeral 32' represents a bleed slot and 33 and 33' are magnetic head cores. Core burying channels are formed on the side surfaces of the floating member 31 in such a manner as to bury the magnetic head cores 33 and 33' and a soft magnetic material is formed inside the channels by thin film formation technique. Reference numerals 35 and 35' represent winding windows. After the soft magnetic material to serve as the magnetic head core is formed on the floating member 31, the magnetic core halves 37a, 38a and the other magnetic core halves 37b, 38b are formed separately from the floating member 31, as will be described elsewhere in further detail. Reference numerals 34 and 34' represent transducing gaps. After the opposed surfaces of the respective core halves that are cut and separated are lapped, the winding window is formed and then the magnetic core halves are bonded and integrated with each other by glass or the like through a non-magnetic gap member. Reference numerals 36 and 36' represent coils.

In this embodiment, the height a of the core is 1.6 mm, its width b is 2 mm and its thickness is from 10 to 50 $\mu$m. The width T of the air bearing rail is from 0.4 to 0.8 mm, the width W of the magnetic head is 3.2 mm, its length W' is 4.0 mm and the depth of the bleed slot 32' is 0.3 mm.

Figure 3A:
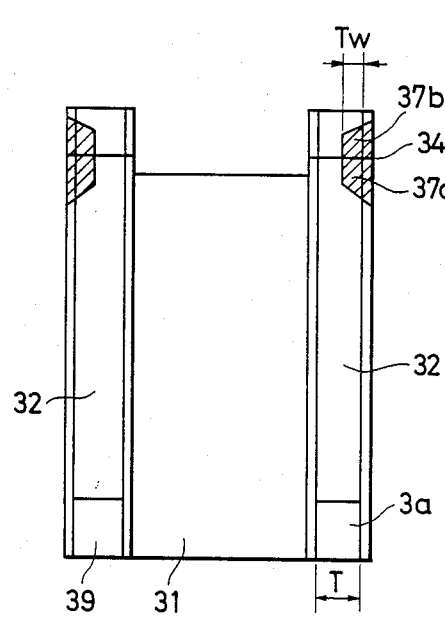
FIGS. 3a and 3b plan and side views of the floating magnetic head of one embodiment of the invention.
Figure 3B:
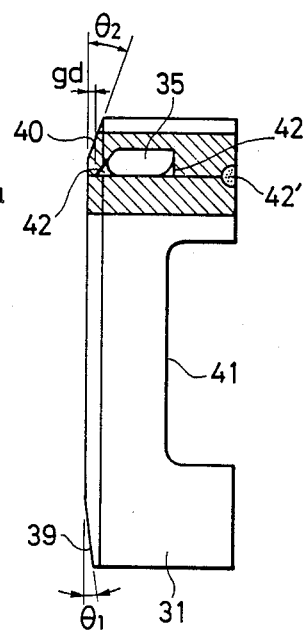

FIG. 3a is a plan view of the floating magnetic head of this embodiment when viewed from the side of a magnetic recording medium and FIG. 3b is its side view.

In FIGS. 3a and 3b, the bleed slot 32' for receiving buoyancy of the airflow is formed on the floating member 31 in such a manner as to leave only the air bearing rail 32. Reference numeral 39 represents a slope as the inflow portion of air and its inclination angle $\theta_1$ is 0.7°.

A slope 40 on the magnetic core side is formed so that the transducing gap 34 of the magnetic core can be brought most closely to the magnetic disk and its inclination angle $\theta_2$ is 20°. A notch 41 in the top portion of the floating member is disposed in order to fit a head arm.

The track width $T_w$ of the magnetic head core can be machined simultaneously with machining of the width T of the air bearing rail 32. Incidentally, bonding of the magnetic gap 34 is effected inside (42) the winding window 35. At times, glass or a resin can be packed into a protective groove 42' for reinforcement.

Since the magnetic head core is disposed on the side surface of the floating member, the gap depth gd can be machined while it is being observed from the side surface.

Embodiment 2

Figure 2:
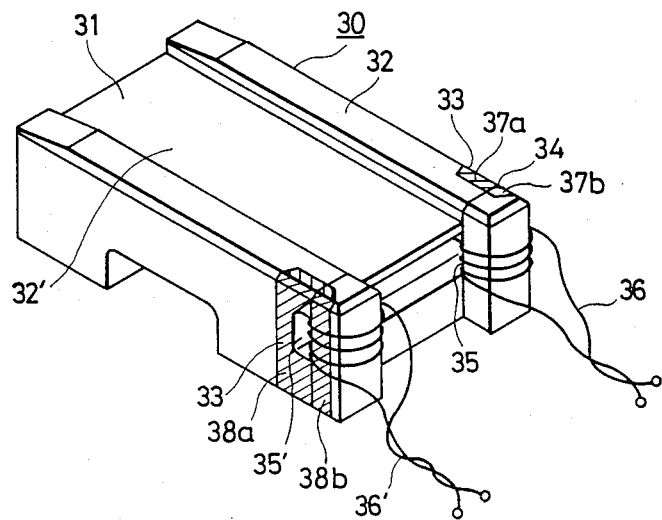
FIG. 2 is a perspective view of the floating magnetic head in another embodiment of the present invention.

FIG. 2 is a perspective view showing the floating magnetic head in accordance with the second embodiment of the present invention. In FIGS. 2–4b, like reference numerals are used to identify like constituents as in FIG. 1.

The difference of this embodiment from the first embodiment shown in FIG. 1 lies in the winding window. In FIG. 2, the winding windows 35 and 35' are formed on the floating member side.

When the coil winding windows are formed on the side of the magnetic core halves 37b, 38b, warp of the substrate becomes a problem at times. In such a case, the winding windows can be formed on the side of the floating member whose substrate is sufficiently thick.

Embodiment 3

Figure 4A:
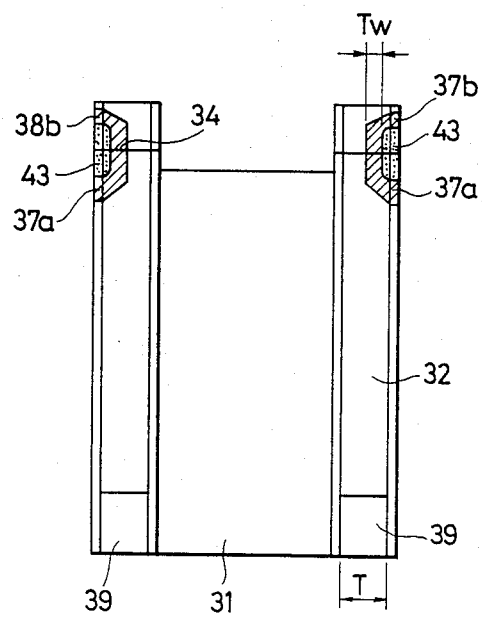
FIGS. 4a and 4b are plan side views of the floating magnetic head in another embodiment of the invention.
Figure 4B:
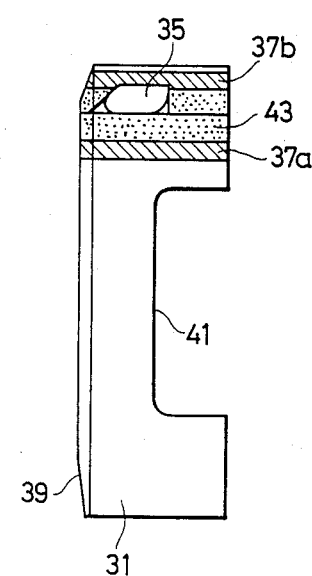

FIG. 4a is a plan view of the floating magnetic head of the third embodiment of the invention when viewed from the magnetic recording medium surface and FIG. 4b is its side view. In this embodiment, a soft magnetic member having a track width $T_w$ is buried in the channel of the floating member and a non-magnetic material 43 is packed into the rest of the channel. According to this arrangement, the track width can be controlled by the thickness of the magnetic member. Since the track width lies only on the top surface of the air bearing rail 32, adverse influences of unnecesary leakage magnetic flux are small at portions other than the track width.

Embodiment 4

An example of the production method of the floating magnetic head of the present invention will be described in detail in this embodiment.

FIGS. 5a to 5i are perspective views and a schematic sectional view (FIG. 5b) showing the production process in this embodiment.

Hereinafter, this embodiment will be described stepwise. For example, the production steps corresponding to FIGS. 5a and 5b will be called "steps (a) and (b)", respectively.

Figure 5A:
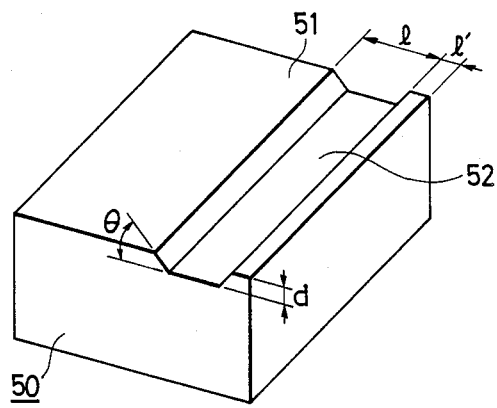
FIGS. 5a to 5i are perspective and schematic sectional views showing stepwise the production method of the floating magnetic head of the present invention.

(1) The step (a) is a step shown in FIG. 5a, where a core burying channel 52 for forming the magnetic head core is disposed on the side surface 51 of a non-magnetic block 50 which is to serve as the floating member. Here, the non-magnetic block 50 is made of zirconia. The channel depth d is 50 μm, its width 1 is 3 mm and its angle $\theta$ is 45°.

As described already, this angle $\theta$ defines the shape of the core burying channel so that the edge portion of the magnetic head core is not parallel to the transducing gap and thus the contour effect can be prevented. The preferred range of this angle $\theta$ in this embodiment is from 30° to 70°. If the angle $\theta$ is below 30°, machining will become difficult and if it is above 70°, the property of the magnetic film formed on the slope will get deteriorated.

The distance l' between the core burying channel 52 and the side surface of the non-magnetic block is 0.1 mm.

Figure 5B:
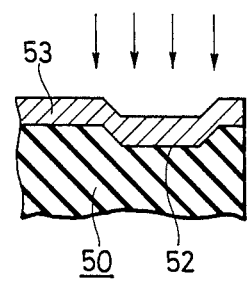
Figure 5C:
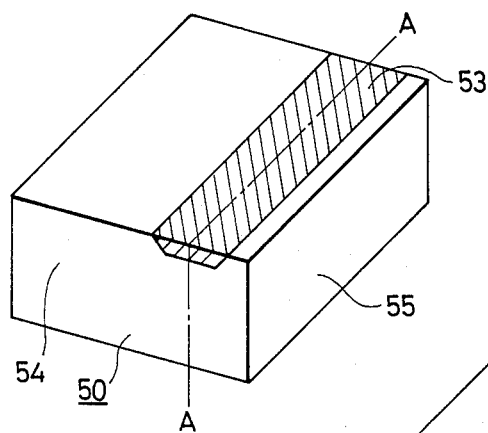
Figure 5D:
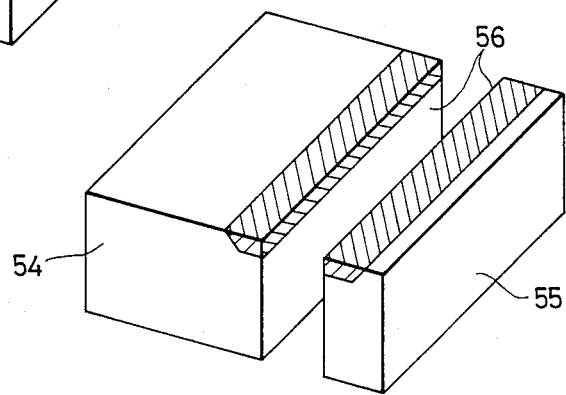
Figure 5E:
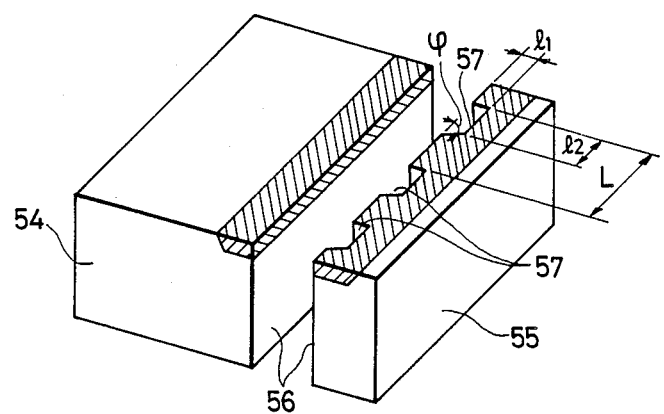
Figure 5F:
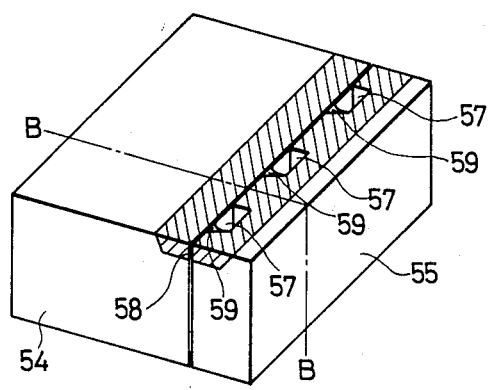
Figure 5G:
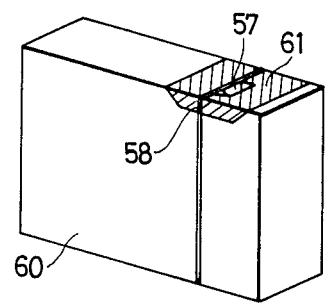
Figure 5H:
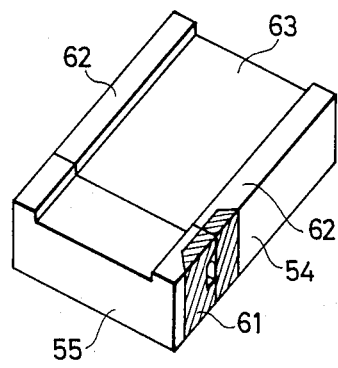
Figure 5I:
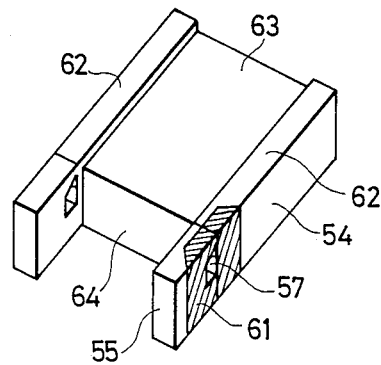

(2) The step (b) is shown in the sectional view of FIG. 5b. At this step, a magnetic film 53 having a higher saturation flux density than that of ferrite is deposited on the core burying channel 52 by sputtering.

This embodiment uses an amorphous alloy of Co-Nb-Zr system having a saturation flux density of 10 kG as the magnetic material.

The magnetic film can be deposited by other methods such as vacuum deposition, ion plating, chemical vapor deposition, plating, and the like. Besides the alloy described above, it is also possible to use Fe-Al-Si alloy (sendust), Ni-Fe alloy (permalloy), or Fe system as the material having a high saturation flux density. Co-system materials as the amorphous alloy as represented by Co-Ta-Zr, Co-W-Zr, Co-Mo-Zr, and the like, can also be used.

The magnetic film may be a multi-layered film formed by laminating alternately a non-magnetic intermediate layer(s) and the magnetic films in order to improve high frequency characteristics.

(3) The step (c) is a step where the unnecessary magnetic film 53 of the block obtained at the step (b) is removed. The film can be removed by grinding, polishing or the like.

(4) The step (d) is a step where the block 50 obtained at the step (c) is split substantially at the center A - A of the magnetic film 53 and the split surface is mirror-polished. In this manner, a pair of magnetic core halves 54 and 55 are formed.

Incidentally, the magnetic core half 54 serves as the floating member, the half 55 is the other magnetic core half facing the transducing gap and reference numeral 56 represents a magnetic gap forming surface.

(5) The step (e) is a step where a plurality of winding channels 57 are formed on at least one of the magnetic gap forming surfaces of the pair of the magnetic core halves obtained at the step (d). In this embodiment, the winding channels 57 are formed on the magnetic core half 55. Next, a non-magnetic material such as $SiO_2$, glass (having a high or low melting point) or the like is formed in a desired thickness by sputtering on the gap forming surface 56 to form a magnetic gap forming film.

In this embodiment, the depth $l_1$ of the channel 57 is 0.4 mm, the width $l_2$ of the channel bottom is 0.5 mm, its angle $\phi$ is 60° and the pitch L of the channels is 2 mm. The magnetic gap forming film is made of $SiO_2$.

(6) The step (f) is a step where a transducing gap 58 is formed by butting the pair of magnetic core halves 54 and 55 in such a manner that their magnetic films are in alignment with each other, and are bonded and integrated with each other while being pressed and heated in order to form the transducing gap 58. In this case, bonding is made by various known methods such as a heat-pressing method which forms a glass film having a low melting point on the magnetic gap forming surfaces, a method which packs glass 59 at part of the winding window (which is used in this embodiment), a method which separately forms bonding channels and bonds the magnetic core halves by use of glass (which is not shown in the drawing), and so forth.

In this embodiment, the block provides three magnetic heads and a block providing a greater number of magnetic heads can be constituted.

(7) The step (g) is a step where one floating magnetic head member 60 is obtained by cutting the joined block along line B - B. The magnetic head core 61 obtained in this member has a structure where it is buried in the side surface of the floating member.

(8) The step (h) is a step where the floating member of the magnetic head member obtained at the step (g) is formed. A 0.3 mm-deep bleed slot 63 is formed on the floating member in such a manner as to leave a predetermined air bearing rail 62.

(9) At this step (i), a channel 64 is formed on the side of the magnetic core half 55 facing the magnetic core half 54 which is to serve as the floating member, together with machining of the step (h), so as to expose the winding window 57 and thus to make it possible to wind the coil.

After the production steps described above are complete, predetermined works such as chamfer of the top edge of the air bearing rail and formation of the slopes presented by 39 and 40 in FIG. 3 are made and after the coil is wound, there can be obtained the floating magnetic head such as shown in FIG. 1. However, the magnetic head core is disposed on only one side surface of the floating member.

Embodiment 5

Figure 6:
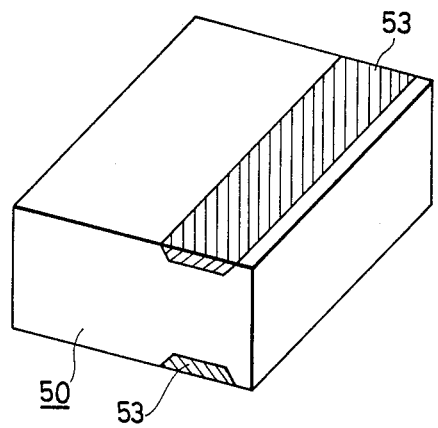
FIGS. 6, 7 and 8 are perspective views showing magnetic head blocks in other embodiment of the invention.

This embodiment relates to a production method of the floating magnetic head of the type wherein the magnetic head cores are disposed on both side surfaces of the floating member. FIG. 6 is a perspective view of the magnetic head core block produced and used in this embodiment.

The floating magnetic head having the magnetic head cores on both side surfaces of the floating member and shown in FIG. 1 can be obtained by following the same procedures as in Embodiment 4 except that the magnetic film 53 is deposited into the channels of both side surfaces of the non-magnetic block 50.

Embodiment 6

Figure 7:
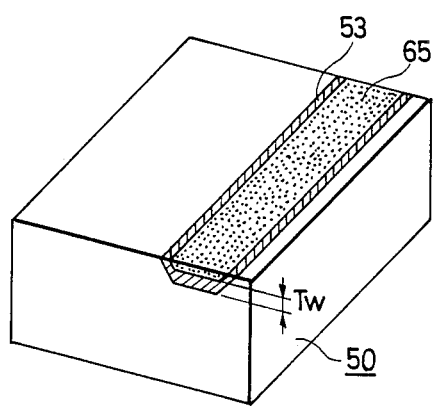

FIG. 7 shows the magnetic head core block of this embodiment. First of all, the magnetic film 53 is deposited into the core burying channel formed in the non-magnetic block 50 in a thickness corresponding to the track width $T_w$ of the magnetic head core, and a non-magnetic member 65 such as a ceramic or glass is deposited or packed into the rest of the core burying channel in order to form the magnetic head core block.

According to this method, the track width $T_w$ can be controlled by the thickness of the magnetic film 53 and high accuracy machining for defining the track width at the machining stage can be eliminated. The non-magnetic member 65 serves also as a reinforcing member of the magnetic film 53.

The production procedures other than the abovementioned are the same as those of Embodiment 4.

Figure 9:
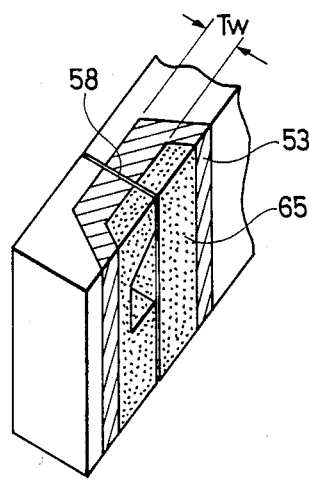
FIG. 9 is an enlarged perspective view of the magnetic head core produced from the magnetic head core block shown in FIG. 7.

FIG. 9 is a partial enlarged view of the magnetic core produced from the magnetic head core block shown in FIG. 7.

Embodiment 7

Figure 8:
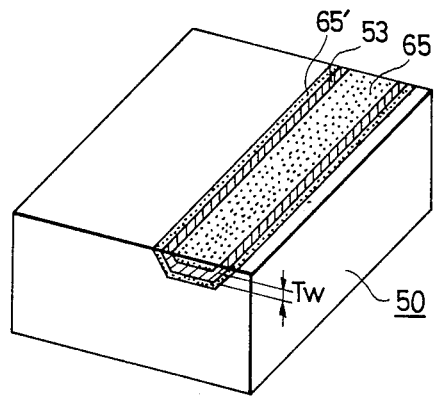

FIG. 8 shows the magnetic head core block of this embodiment. In this embodiment, a non-magnetic member 65', a magnetic film 53 and a non-magnetic member 65 are formed in order named in the channel formed on the non-magnetic block 50. The thickness of the magnetic film 53 is equal to the track width $T_w$ and this film 53 is sandwiched between the non-magnetic members 65 and 65'. If the non-magnetic members 65, 65' are made of a metallic material in this case, a magnetic shield effect can be obtained and the leakage of magnetic flux at portions other than at the transducing gap can be prevented. Therefore, the magnetic head has a higher effect.

Metals such as Cu, Ag, Al, Cr, Ti and the like can be used as the non-magnetic members 65 and 65'. It is advisable to reinforce the non-magnetic member 65 by an oxide material such as ceramics.

The production procedures other than the abovementioned are the same as those of Embodiment 4.

Figure 10:
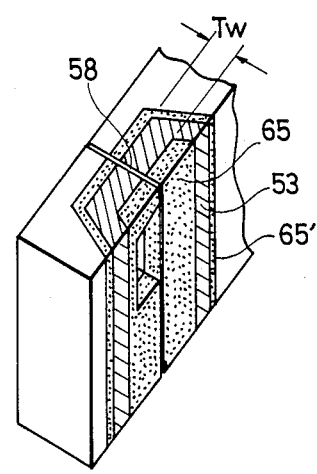
FIG. 10 is an enlarge perspective view of the magnetic head core produced from the magnetic head core block shown in FIG. 8.

FIG. 10 is a partial enlarged view of the magnetic core produced from the magnetic head core block shown in FIG. 8.

Embodiment 8

Figure 11:
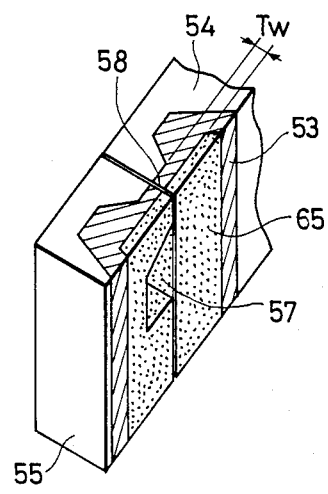
FIG. 11 is an enlarged perspective view of the magnetic head core of a narrow track magnetic head in the present invention.

This embodiment relates to a narrow track type floating magnetic head. FIG. 11 is an enlarged view of the magnetic head core as the principal portion of the floating magnetic head in this embodiment.

In FIG. 11, a channel which becomes convexed near the transducing gap 58 is formed in each magnetic core half 54, 55 and a magnetic film 53 to serve as the magnetic core is formed in the channel by sputtering and subsequent lapping or grinding. In this manner, there can be obtained a structure which is contracted near the transducing gap 58 (so-called "taperflat profile"). According to this structure, even if the track width $T_w$ is below 10 $\mu$m, the magnetic resistance of the magnetic core does not become high and a floating magnetic head having high efficiency and a narrow track can be obtained. Reference numeral 65 represents a non-magnetic material layer. Even when chamfer work of the air bearing rail of the magnetic core is made, the track width $T_w$ does not change, and the protection effect of the magnetic film 53 can be obtained.

The non-magnetic material layer 65 is formed by sputtering of vacuum-depositing a ceramic material such as $Al_2O_3.SiO_2$, $Al_2O_3.MgO$, or the like. It is also advisable to pack glass for reinforcement.

The structure other than the above-mentioned is the same as that of FIG. 4.

Embodiment 9

Figure 12:
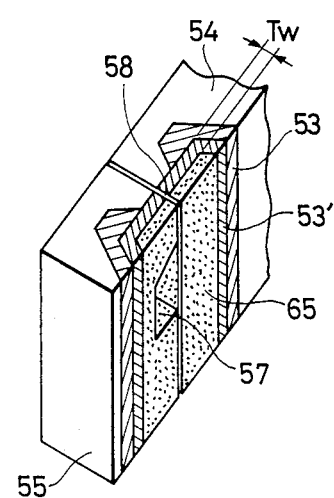
FIG. 12 is an enlarged perspective view of the magnetic head core of another narrow track magnetic head in the present invention.
Figure 13A:
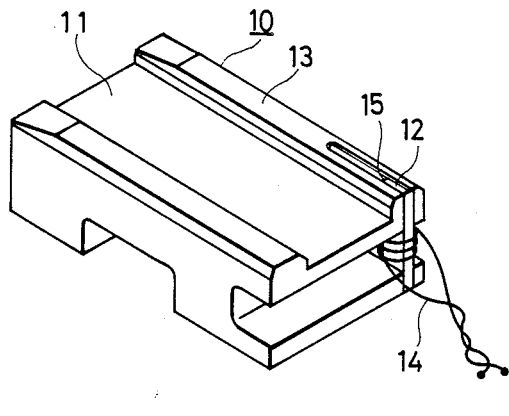
FIGS. 13a and 13b are perspective view and enlarged perspective view of principal portions of a convention floating magnetic head.
Figure 13B:
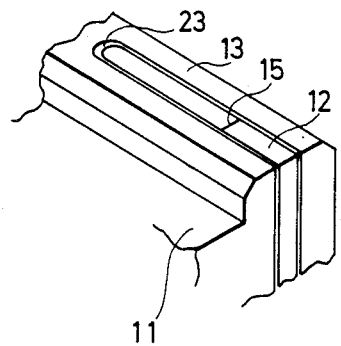
Figure 14A:
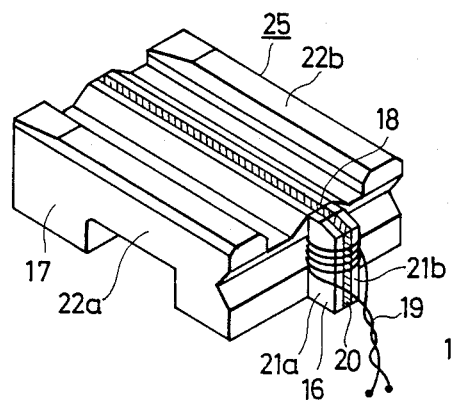
FIGS. 14a and 14b are perspective view and enlarged perspective view of principal portions of another conventional floating magnetic head.
Figure 14B:
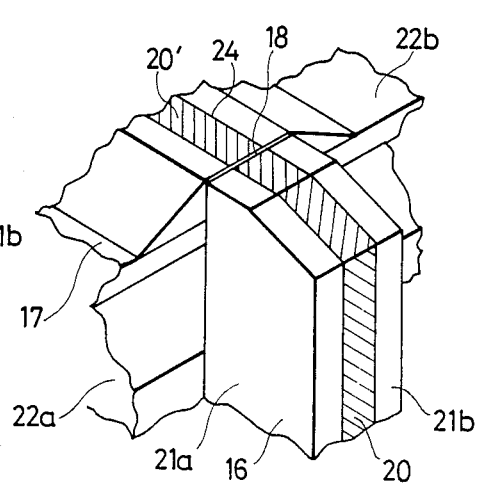

This embodiment relates to another narrow track type floating magnetic head in the present invention. FIG. 12 is an enlarged perspective view of the magnetic head core as the principal portion of the floating magnetic head in this embodiment. The basic structure of the magnetic head in this embodiment is substantially the same as that of FIG. 11. The head shown in FIG. 12 uses two kinds of materials for the magnetic film. Namely, the magnetic film 53' at the portion corresponding to the track width $T_w$ is made of a magnetic member having a higher saturation flux density than that of the other magnetic film 53.

For example, the magnetic film 53 consists of an amorphous magnetic film having a saturation flux density of from 8 kG to 10 kG while the magnetic film 53' consists of a polycrystalline magnetic film whose saturation flux density is at least 15 kG. According to this structure, magnetic saturation near the transducing gap can be avoided even for a high coersive magnetic medium for high density recording. Furthermore, a floating magnetic head having higher efficiency can be obtained because the magnetic film 53 serves also as an auxiliary magnetic circuit.

The magnetic head having such a structure can be turned into a high performance magnetic head by forming the film 53 by a magnetic film which can be formed easily and has stable magnetic characteristics and by forming the magnetic film 53' having a high saturation flux density near the transducing gap with a high level of accuracy.

The structure other than the above-mentioned is the same as that of Embodiment 8.

The floating magnetic head of the present invention described in each of the fore-going embodiments provides the following effects.

(1) The head is suitable for high density magnetic recording because the magnetic circuit is formed by the magnetic material having a high saturation flux density in the magnetic core portion.

(2) Mechanical strength of the head is high because the magnetic core portion is buried in the core burying channel on the side surface of the floating member.

(3) Since the magnetic core portion is buried in the core burying channel of the floating member, the bonding step by use of glass or the like may be only one so that the production method is simple and suitable for mass-production.

(4) Since the magnetic core is formed by thin film formation technique, a multi-layered film for improving high frequency characteristics and a narrow track width can be formed with a high level of accuracy.

In accordance with the present invention, further, a narrow track head having a track width of below 10 μm can be produced efficiently.

Due to the various effects described above, the floating magnetic head consisting of at least two kinds of materials for constituting the floating member and the magnetic head core can be produced economically and at high yield.

It is to be noted that in the floating magnetic head of the present invention, heretofore known technique can be adopted in connection with matters not specifically described herein.

What is claimed is:

1. In a floating magnetic head of the type wherein a magnetic head core is provided on at least one air bearing rail of a floating member floating on a magnetic disk by an airflow, the improvement wherein said magnetic head core is buried in a core burying channel disposed on an outer side surface of said at least one air bearing rail, said outer side surface being substantially at a right angle to a surface facing a magnetic recording medium and being parallel to a magnetic recording medium travelling direction, said core burying channel being substantially at a right angle to said surface facing the magnetic recording medium, and wherein said magnetic head core is made of a thin film deposited in said core burying channel.

2. A floating magnetic head according to claim 1, wherein said floating member has two said air bearing rails on the outer portion thereof, a depth of said core burying channel corresponds substantially to a thickness of said magnetic head core, at least one of two core halves obtained by splitting said magnetic head core together with said floating member on a split surface perpendicular to the top surface of said air bearing rails and to a magnetic recording medium travelling direction has a winding window and said two core halves face each other through a non-magnetic gap member.

3. A floating magnetic head according to claim 1, wherein a edge portion of said magnetic head core in the magnetic recording medium travelling direction, when viewed from the side of said surface facing the magnetic recording medium is not parallel to a transducing gap.

4. A floating magnetic gap according to claim 1, wherein an exposed portion of a transducing gap on a side of a magnetic recording medium facing surface of said magnetic head core lies only inside the top surface of said air bearing rail.

5. A floating magnetic head according to claim 1, wherein non-magnetic material exists on at least one of side surfaces of said magnetic head core buried into said core burying channel.

6. A floating magnetic head according to claim 1, wherein a portion of said magnetic head core near a transducing gap is contracted corresponding to a track width.

* * * * *